(12) United States Patent
Chiu et al.

(10) Patent No.: US 8,547,078 B2
(45) Date of Patent: Oct. 1, 2013

(54) METHODS FOR LIGHT LOAD EFFICIENCY IMPROVEMENT OF A BUCK BOOST VOLTAGE REGULATOR

(75) Inventors: Tzu-Huan Chiu, Jhubei (TW); Kwan-Jen Chu, Hsinchu (TW); Chien-Ping Lu, Jhubei (TW); Wei-Hsin Wei, Jhubei (TW)

(73) Assignee: Richtek Technology Corp., Hsinchu (TW)

( * ) Notice: Subject to any disclaimer, the term of this patent is extended or adjusted under 35 U.S.C. 154(b) by 217 days.

(21) Appl. No.: 12/861,952

(22) Filed: Aug. 24, 2010

(65) Prior Publication Data

US 2011/0050192 A1    Mar. 3, 2011

(30) Foreign Application Priority Data

Aug. 27, 2009  (TW) .............................. 98128823 A

(51) Int. Cl.
*G05F 1/00*     (2006.01)

(52) U.S. Cl.
USPC ............................ 323/284; 323/285; 323/290

(58) Field of Classification Search
USPC ............................ 323/282, 284, 285, 290, 259
See application file for complete search history.

(56) References Cited

U.S. PATENT DOCUMENTS

| | | | | |
|---|---|---|---|---|
| 5,808,455 A * | 9/1998 | Schwartz et al. | ............. | 323/271 |
| 6,329,801 B1 * | 12/2001 | Zuniga et al. | ................. | 323/285 |
| 6,346,801 B1 * | 2/2002 | Zafarana et al. | ............. | 323/284 |
| 6,972,548 B2 * | 12/2005 | Tzeng et al. | ................. | 323/282 |
| 7,265,524 B2 * | 9/2007 | Jordan et al. | .................. | 323/225 |
| 7,535,122 B2 * | 5/2009 | Visairo-Cruz et al. | ......... | 307/80 |
| 7,592,791 B2 * | 9/2009 | Emira | ........................... | 323/283 |
| 7,808,217 B2 * | 10/2010 | de Cremoux et al. | ......... | 323/222 |
| 2004/0070378 A1 * | 4/2004 | Baldwin et al. | ............... | 323/282 |
| 2009/0046487 A1 * | 2/2009 | Emira | ............................. | 363/78 |
| 2009/0200995 A1 * | 8/2009 | Tran et al. | ..................... | 323/222 |
| 2011/0157941 A1 * | 6/2011 | Yedevelly et al. | ............ | 363/126 |
| 2012/0223693 A1 * | 9/2012 | Tang et al. | ..................... | 323/283 |

* cited by examiner

*Primary Examiner* — Jue Zhang
*Assistant Examiner* — Lakaisha Jackson
(74) *Attorney, Agent, or Firm* — Muncy, Geissler, Olds & Lowe, PLLC

(57) ABSTRACT

Methods are proposed for a buck boost voltage regulator to monitor the output voltage or both the inductor current and the output voltage of the buck boost voltage regulator to control the buck boost voltage regulator to reduce the switching times of the power switches of the buck boost voltage regulator to improve the light load efficiency of the buck boost voltage regulator.

3 Claims, 5 Drawing Sheets

METHODS FOR LIGHT LOAD EFFICIENCY IMPROVEMENT OF A BUCK BOOST VOLTAGE REGULATOR

FIELD OF THE INVENTION

The present invention is related generally to a voltage regulator and, more particularly, to methods for light load efficiency improvement of a buck boost voltage regulator.

BACKGROUND OF THE INVENTION

Batteries are unable to continuously supply a stable voltage, so systems using batteries as power source, e.g. portable electronic devices, need to be equipped with a buck boost voltage regulator that is capable of switching between a buck mode and a boost mode. FIG. 1 is a circuit diagram of a buck boost voltage regulator, in which a power stage 10 has a power switch SW1 connected between the power input terminal Vin and a node N1, a power switch SW2 connected between the node N1 and ground GND, an inductor L connected between the node N1 and a node N2, a power switch SW3 connected between the node N2 and ground GND, a power switch SW4 connected between the node N2 and the voltage output terminal Vout, and a capacitor CL connected between the voltage output terminal Vout and ground GND, voltage divider resistors R1 and R2 divide the output voltage Vout to generate a feedback signal VFB, and a control circuit 12 has an error amplifier 14 to amplify the difference between the feedback signal VFB and a reference voltage Vref to generate an error signal VEA, a pulse width modulation generator 16 to generate a pulse width modulation signal PWM according to the error signal VEA, and a control logic circuit 18 to generate control signals VA, VB, VC and VD according to the pulse width modulation signal PWM to switch the power switches SW1, SW2, SW3 and SW4 respectively, to convert the input voltage Vin to the output voltage Vout. U.S. Pat. No. 7,265,524 issued to Jorden et al. proposed a control method for a buck boost voltage regulator, which monitors the output voltage Vout of the buck boost voltage regulator when the buck boost voltage regulator operates in a buck-boost mode, and when the output voltage Vout goes above a high voltage threshold, switches the buck boost voltage regulator to a sleep mode. In this sleep mode, the power switches SW1, SW2, SW3 and SW4 are all open to stop charging the inductor L of the buck boost voltage regulator and thus the output voltage Vout decreases slowly. Till the output voltage Vout goes below a low voltage threshold, the buck boost voltage regulator is switched back to the buck-boost ode in which the inductor L is continuously charged/discharged to regulate the output voltage Vout.

SUMMARY OF THE INVENTION

An object of the present invention is to provide methods for light load efficiency improvement of a buck boost voltage regulator.

According to the present invention, a method for light load efficiency improvement of a buck boost voltage regulator monitors the inductor current of the buck boost voltage regulator and switches the buck boost voltage regulator to a sleep mode when the inductor current goes below a low current threshold. In the sleep mode, the output voltage of the buck boost voltage regulator is monitored and when the output voltage goes below a low voltage threshold, the buck boost voltage regulator is switched to escape from the sleep mode.

According to the present invention, a method for light load efficiency improvement of a buck boost voltage regulator monitors the output voltage of the buck boost voltage regulator and switches the buck boost voltage regulator to a pulse skipping mode when the output voltage goes above a high voltage threshold. In the pulse skipping mode, the inductor of the buck boost voltage regulator is charged once whenever the output voltage goes below the high voltage threshold and if the output voltage goes below a low voltage threshold, the buck boost voltage regulator is switched to escape from the pulse skipping mode.

According to the present invention, a method for light load efficiency improvement of a buck boost voltage regulator monitors the inductor current of the buck boost voltage regulator and switches the buck boost voltage regulator from a first switch period to a second switch period longer than the first switch period when the inductor current goes below a low current threshold. Under the second switch period, the output voltage of the buck boost voltage regulator is monitored and when the output voltage goes below a low voltage threshold, the buck boost voltage regulator is switched back to the first switch period.

According to the present invention, a method for light load efficiency improvement of a buck boost voltage regulator monitors the output voltage of the buck boost voltage regulator and switches the buck boost voltage regulator from a first switch period to a second switch period longer than the first switch period when the output voltage goes above a high voltage threshold. Under the second switch period, if the output voltage goes below a low voltage threshold, the buck boost voltage regulator is switched back to the first switch period.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
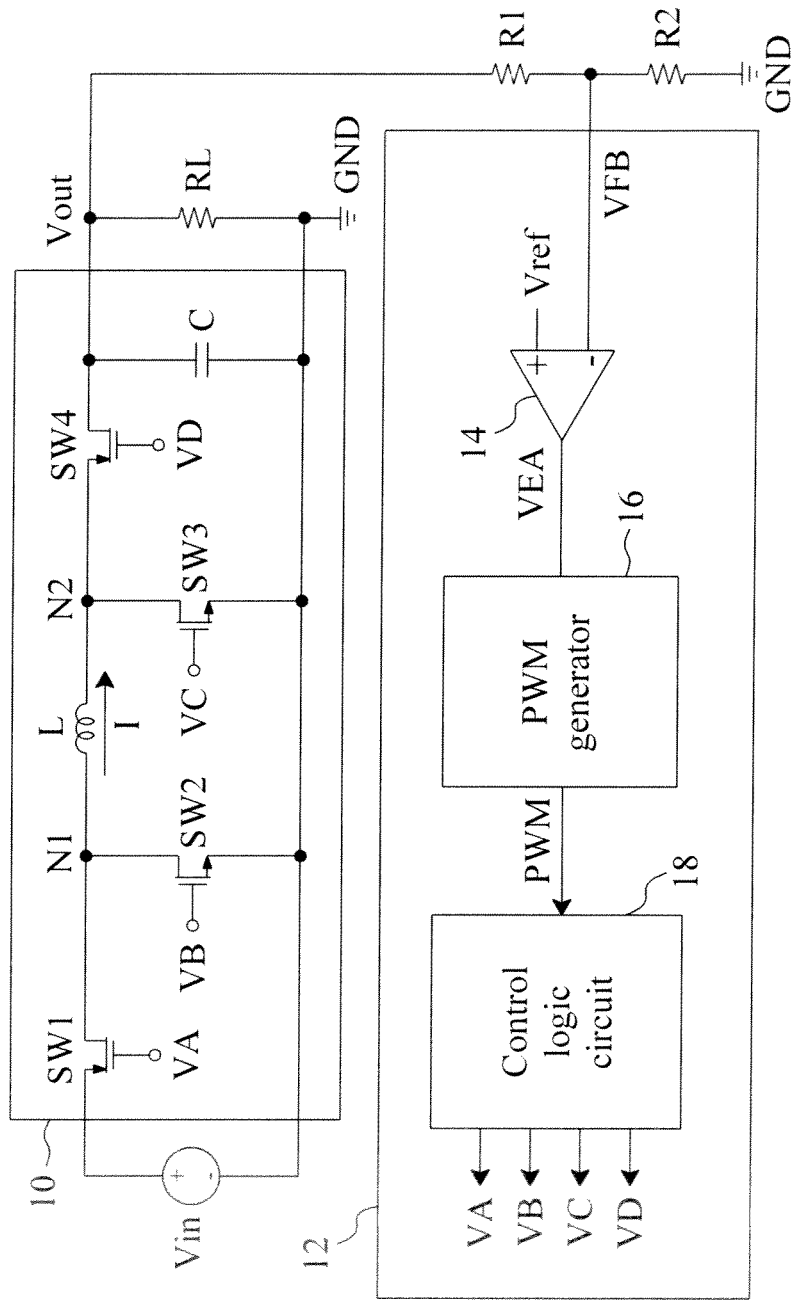
FIG. 1 is a circuit diagram of a typical buck boost voltage regulator.
Figure 2:
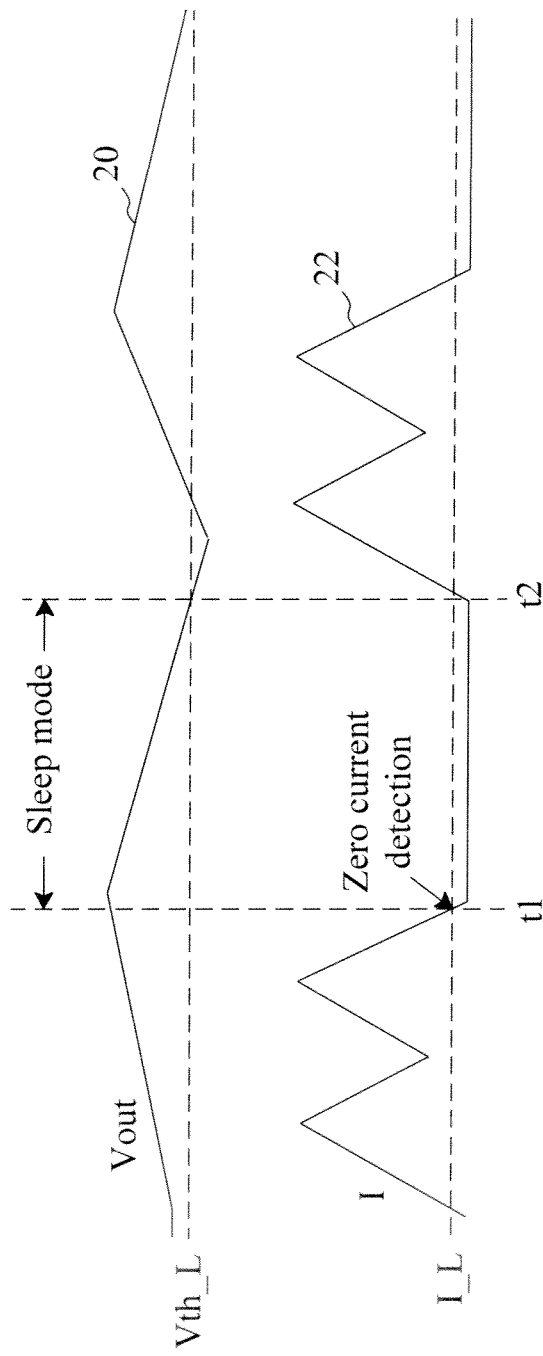
FIG. 2 is a waveform diagram of a buck boost voltage regulator using a first embodiment of a method according to the present invention.

FIG. 2 is a waveform diagram illustrating a first embodiment of a method for light load efficiency improvement of a buck boost voltage regulator, in which waveforms 20 and 22 represent the output voltage Vout and the inductor current I of the buck boost voltage regulator, respectively. Referring to FIGS. 1 and 2, this method monitors the inductor current I and when the inductor current I goes below a low current threshold I_L, as shown at time t1, the buck boost voltage regulator is switched to a sleep mode in which the power switches SW1, SW2, SW3 and SW4 are all open to stop charging the inductor L and as a result, the output voltage Vout decreases. When the output voltage Vout goes below a low voltage threshold Vth_L, as shown at time t2, the buck boost voltage regulator is switched to escape from the sleep mode. Preferably, when it is detected that the output voltage Vout goes below the low voltage threshold Vth_L and the inductor current I goes below the low current threshold I_L, the buck boost voltage regulator will escape from the sleep mode immediately after entering into the sleep mode to increase the output voltage Vout. This method monitors both the inductor current I and the output voltage Vout, sets the low current threshold I_L approximately zero, and reduces the power consumption at light load by controlling the timing of the buck boost voltage regulator entering into and escaping from the sleep mode.

Figure 3:
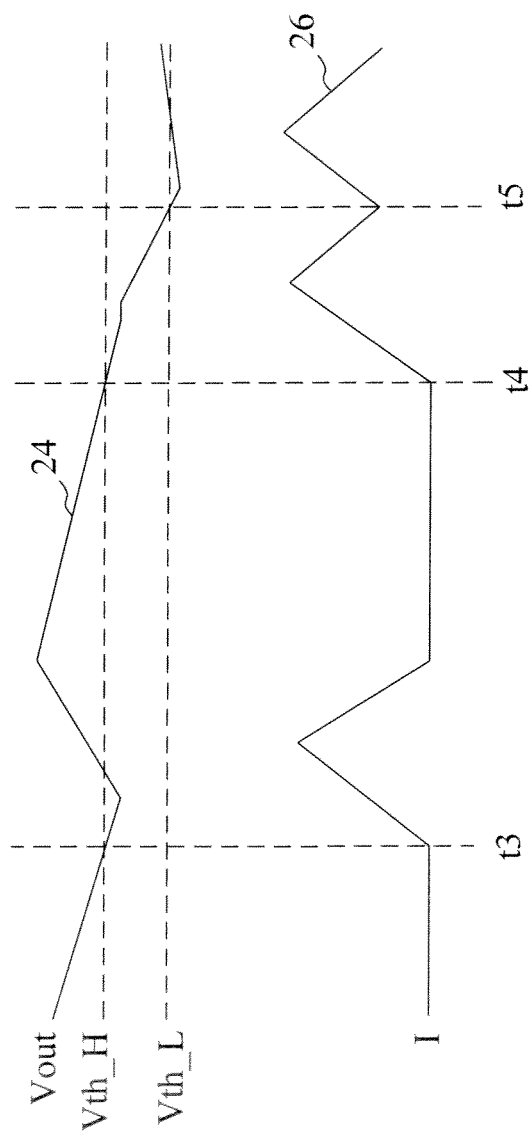
FIG. 3 is a waveform diagram of a buck boost voltage regulator using a second embodiment of a method according to the present invention.

FIG. 3 is a waveform diagram illustrating a second embodiment of a method for light load efficiency improvement of a buck boost voltage regulator, in which waveforms 24 and 26 represent the output voltage Vout and the inductor current I of the buck boost voltage regulator, respectively. Referring to FIGS. 1 and 3, this method only monitors the output voltage Vout and when the output voltage Vout goes above a high voltage threshold Vth_H, switches the buck boost voltage regulator to a pulse skipping mode in which some pulses of the pulse width modulation signal PWM are skipped to reduce the switching times of the power switches SW1, SW2, SW3 and SW4. In the pulse skipping mode, whenever it is detected that the output voltage Vout goes below the high voltage threshold Vth_H, as shown at time t3 and time t4, the inductor L is charged once to increase the output voltage Vout; however, if the output voltage Vout still continuously decreases to lower than a low voltage threshold Vth_L, as shown at time t5, the buck boost voltage regulator is switched to escape from the pulse skipping mode.

Figure 4:
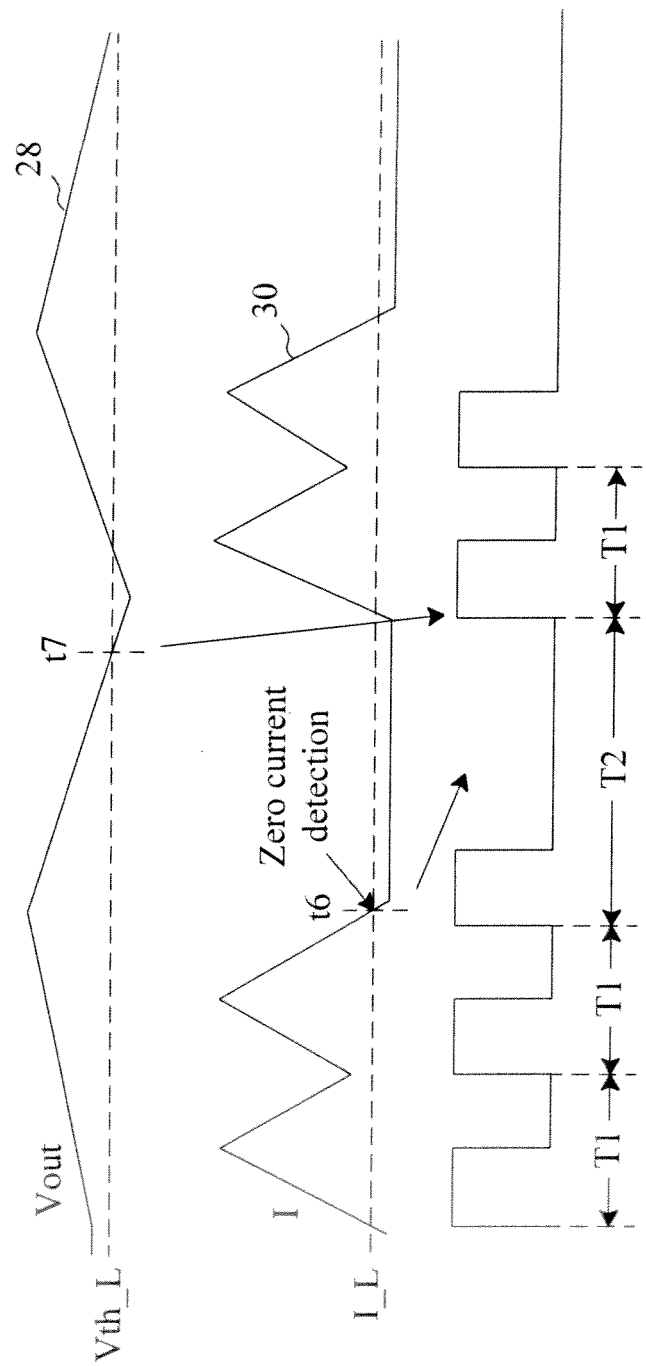
FIG. 4 is a waveform diagram of a buck boost voltage regulator using a third embodiment of a method according to the present invention.

FIG. 4 is a waveform diagram illustrating a third embodiment of a method for light load efficiency improvement of a buck boost voltage regulator, in which waveforms 28 and 30 represent the output voltage Vout and the inductor current I of the buck boost voltage regulator, respectively. Referring to FIGS. 1 and 4, in this embodiment, the pulse width modulation generator 16 has a short switch period T1 and a long switch period T2. The short switch period T1 is used in a normal operation mode and when the inductor current I goes below the low current threshold I_L, as shown at time t6, the pulse width modulation generator 16 switches to provide the long switch period T2 to reduce the switching frequency of the power switches SW1, SW2, SW3 and SW4. Under the long switch period T2, when it is detected that the output voltage Vout goes below a low voltage threshold Vth_L, the pulse width modulation generator 16 switches back to provide the short switch period T1, so the power switches SW1, SW2, SW3 and SW4 restore the switching frequency of the normal operation mode. This method monitors both the inductor current I and the output voltage Vout, set the low current threshold I_L approximately zero, and reduces the power consumption at light load by reducing the switching frequency of the power switches SW1, SW2, SW3 and SW4.

Figure 5:
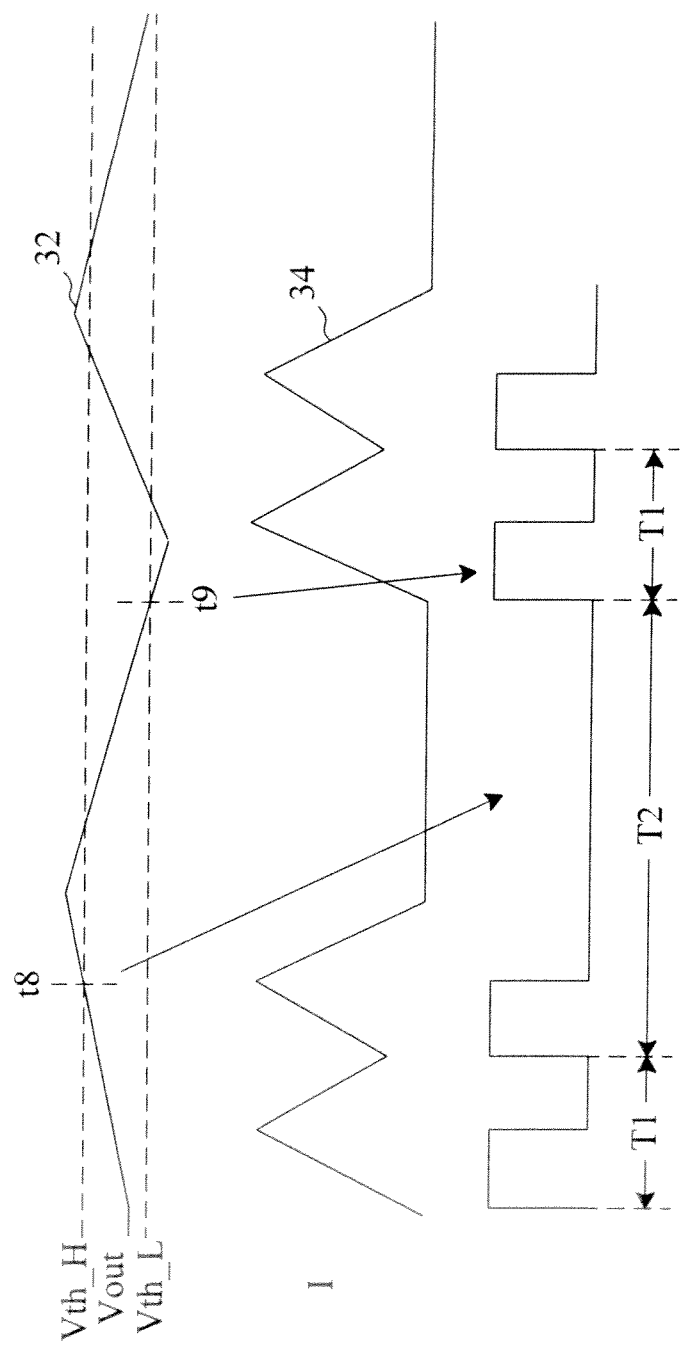
FIG. 5 is a waveform diagram of a buck boost voltage regulator using a fourth embodiment of a method according to the present invention.

FIG. 5 is a waveform diagram illustrating a fourth embodiment of a method for light load efficiency improvement of a buck boost voltage regulator, in which waveforms 32 and 34 represent the output voltage Vout and the inductor current I of the buck boost voltage regulator, respectively. Referring to FIGS. 1 and 5, this method only monitors the output voltage Vout and the pulse width modulation generator 16 has a short switch period T1 and a long switch period T2. The short switch period T1 is used in a normal operation mode and when it is detected that the output voltage Vout goes above a high voltage threshold Vth_H, as shown at time t8, the pulse width modulation generator 16 switches to provide the long switch period T2 to reduce the switching frequency of the power switches SW1, SW2, SW3 and SW4. Under the long switch period T2, when it is detected that the output voltage Vout goes below the low voltage threshold Vth_L, as shown at time t9, the pulse width modulation generator 16 switches back to provide the short switch period T1, so the power switches SW1, SW2, SW3 and SW4 restore the switching frequency of the normal operation mode.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for light load efficiency improvement of a buck boost voltage regulator, comprising the steps of:
    monitoring an output voltage of the buck boost voltage regulator;
    switching the voltage regulator to a pulse skipping mode when the output voltage goes above a high voltage threshold; and
    in the pulse skipping mode, charging an inductor of the buck boost voltage regulator once whenever the output voltage goes below the high voltage threshold, and switching the buck boost voltage regulator to escape from the pulse skipping mode if the output voltage goes below a low voltage threshold.

2. A method for light load efficiency improvement of a buck boost voltage regulator, comprising the steps of:
    monitoring an inductor current of the buck boost voltage regulator for switching the buck boost voltage regulator from a first switch period to a second switch period longer than the first switch period when the inductor current goes below a low current threshold; and
    monitoring an output voltage of the buck boost voltage regulator under the second switch period for switching the buck boost voltage regulator back to the first switch period when the output voltage goes below a low voltage threshold.

3. The method of claim 2, wherein the low current threshold is approximately zero.

* * * * *